United States Patent

Haswell, III et al.

[15] 3,663,787

[45] June 16, 1972

[54] ELECTRICALLY-ASSISTED COMBUSTION CUTTING APPARATUS

[72] Inventors: Walter T. Haswell, III; Terry O. Hockenberry; Everard M. Williams, all of Pittsburgh, Pa.

[73] Assignees: Walter T. Haswell, III; Terry O. Hockenberry; Everard M. Williams, Pittsburgh, Pa., part interest to each

[22] Filed: June 25, 1969

[21] Appl. No.: 836,528

[52] U.S. Cl.............................219/69 V, 51/267, 219/69 D, 219/69 E, 219/69 M
[51] Int. Cl.............................................................B23p 1/12
[58] Field of Search.................51/9, 267; 219/69 D, 69 E, 219/69 R, 69 G, 69 M, 69 V

[56] References Cited

UNITED STATES PATENTS

| | | | |
|---|---|---|---|
| 2,526,423 | 10/1950 | Rudorff | 219/69 D |
| 2,974,216 | 3/1961 | Inoue | 219/69 V |
| 3,487,189 | 12/1969 | Moore | 219/69 V |
| 524,572 | 8/1894 | Beckert | 51/267 X |
| 1,556,325 | 10/1925 | Grumpelt | 219/69 V |
| 2,059,236 | 11/1936 | Holslag | 219/69 M |
| 2,204,636 | 6/1940 | Turnbull | 51/9 |
| 2,785,280 | 3/1957 | Eisler et al. | 219/69 V |
| 2,906,853 | 9/1959 | Sibley | 219/69 V |
| 3,122,628 | 2/1964 | Inoue | 219/69 V |

Primary Examiner—R. F. Staubly
Attorney—Buell, Blenko & Ziesenheim

[57] ABSTRACT

Cutting apparatus comprises cutting electrode, means for moving the electrode, and means for supporting a workpiece adjacent a cutting surface of the electrode such that the cutting surface can be moved continuously in a direction substantially parallel to the face of the cut to be made in the workpiece. Means provided for translating one of the workpiece and the electrode toward and away from the other. A source of electric potential and a pulse generating circuit are connected to the electrode and workpiece to induce repetitive discharges across a gap between the electrode and workpiece. The apparatus further includes means for interjecting a combustion supporting medium into the gap whereby combustion of workpiece at the cutting face is initiated by the gap discharges.

3 Claims, 5 Drawing Figures

Patented May 16, 1972

INVENTORS
Terry O. Hockenberry, Everard M. Williams
and Walter T. Haswell III
BY
Buell, Blenko & Ziesenheim
THEIR ATTORNEYS Patented May 16, 1972

INVENTORS
Terry O. Hackenberry, Everard M. Williams
and Walter T. Haswell III
BY

THEIR ATTORNEYS

ELECTRICALLY-ASSISTED COMBUSTION CUTTING APPARATUS

Our present invention relates to novel cutting or machining apparatus which combines the techniques of spark cutting or machining and localized combustion or burning of the workpiece. Abrasive or mechanical cutting further can be combined with these techniques, in accord with our invention. Our apparatus, for example, combines the advantages of electric discharge or spark machining, oxygen cutting, and mechanical cutting or abrasion without exhibiting the disadvantages of each of these techniques when employed alone.

As used herein, the term "cutting" refers to a number of material removal operations, such as sawing or severing, grinding, milling, planing, and shaping.

The disadvantages of electric arc cutting and of oxygen or torch cutting are obvious, and need only be reiterated briefly without the citation of particular references. Neither of these cutting techniques is capable of producing a relatively smooth cut. The edges of the cut are usually jagged and are unsuitable for many applications. It is extremely difficult to feed either a cutting torch or an arc cutter automatically into a workpiece at a varying speed, i.e., a speed dependent upon the rate of material removal. Occasionally the cutting torch goes "out" and time is lost in restarting the cut. In addition, the oxygen cutting torch cannot be used on materials which produce high temperature oxides whenever the oxides solidify and block the cutting process.

Certain disadvantages of friction and abrasive cutting techniques are equally obvious. The cutting speed of the related apparatus is dependent, to a large extent, upon the hardness of workpiece material. Friction cutting, moreover, is hazardous when blades having high rotational speeds are necessarily utilized, depending again on workpiece hardness. With a large diameter blade an extremely high peripheral or edge speed is obtained. There have been many instances involving explosion of the blade and resultant personal injury.

We are aware, of course, of the limited amount of prior art which may have a more direct bearing on this subject than that discussed generally above. There is, for example, a brief article in the January, 1967 issue of *Metals* which describes an arc cutting technique using a movable electrode in the form of a rotating disc. Compressed air is blown through radial passages in the disc to aid in removing molten metal from the face of the cut. The rotating discoidal electrode is utilized to reduce the usually rapid consumption of the electrode in this type of arc cutting. A continuous arc is employed in the *Metals* reference which causes disadvantageous removal of metal both from the face and sides of the cut. A ragged and inaccurate cut, such as that mentioned previously, results. The *Metals* reference purports to reduce sidewise arcing by milling shallow recesses into the sides of the disc. While this may reduce sidewise arcing to some extent, it cannot prevent such arcing. Moreover, the laterally projecting rims of the disc are rapidly worn away during the cutting operation so that the original undesirable situation attains after a short interval. In our apparatus, one of the material removal mechanisms includes repetitive transient discharges rather than a continuous arc. In this type of electrical cutting, material is removed only from the face of the cut.

Another reference of interest is the U.S. Pat. to Rudorff No. 2,526,423. The Rudorff cutting apparatus is a straightforward modification of a typical electric discharge machining (EDM) apparatus or of electrochemical machining (ECM) apparatus wherein the electrode is continuously and rapidly moved rather than being maintained in a quiescent state (save for limited movement to preserve gap width). As depicted in this patent, the moving electrode takes the form of a band or wire-type cutter or a rotating disc with an electric supply connected between the cutter and a workpiece. In addition to its rapid movement along an endless path, the electrode is fed in quiescent fashion slowly toward the workpiece or vice versa as the cutting action very slowly proceeds. An electrolyte solution (ECM) or a dielectric fluid (EDM) is fed continuously into the area between the moving electrode and the workpiece. Although ECM and EDM procedures, in general, have found many applications in industry, their material removal rates are not sufficiently rapid for cutting or sawing operations. The Rudorff apparatus likewise suffers from this disadvantage. By combining EDM techniques with torch cutting in a unique manner, we are enabled to cut or saw with metal removal rates of the order of ten times that of conventional EDM or ECM techniques.

In the practice of our invention, a continuously moving electrode such as a rotatable disc is closely spaced relative to a workpiece to be cut or sawed. A material capable of supporting combustion of the workpiece, such as gaseous oxygen, is flowed into the space between the moving electrode and the workpiece. Repetitive electrical discharges occur in EDM fashion, i.e., by repeated sparkover of the gas or other insulating medium between the electrode and work, rather than as a continuous arc. Each sparkover initiated discharge brings a highly localized area of the workpiece to its melting temperature whereupon the material ignites and burns rapidly in the presence of the combustive material. A most significant advantage is the confinement of both the gap discharges and the combustional process to the face of the cut. The sparkover initiated discharge affords a continuous ignition for the combusting workpiece material at the face of the cut so that it is impossible for the "flame" to go out. On the other hand, the cutting operation is readily controllable, as the combustion is extinguished upon termination of the gap discharges.

The electrode of our unique apparatus need only be rotated or otherwise moved with sufficient rapidity to prevent overheating. Desirably the electrode is spaced sufficiently close to remove the molten and combusting workpiece material from the face of the cut as it is melted. It is also contemplated that an electrode of sufficient hardness can be rotated or otherwise moved in contact with the face of the cut so as to add mechanical attrition to the combinative cutting process. Means are provided for preventing the accumulation of molten workpiece material or slag upon the moving electrode.

An advantage of our cutting apparatus is that its cutting speed is substantially independent of the hardness and the oxidizability of the workpiece material. It is not necessary to use a high-speed cutting blade as in the case of frictional or abrasive cutting equipment. Nor does the electrode have to be harder than the workpiece material. Finally, our cutting apparatus can be automated, as we provide an electrical control signal which automatically adjusts itself for varying metal removal rates.

The sparkover initiated discharges occur only between the peripheral edge of the cutter and the face of the cut in the workpiece as in a typical EDM process. There is no discharge and attendant burning of the workpiece at the sides of the cut. In consequence, a relatively smooth and accurate cut is produced. Although there is wear on the electrode, the wear is even around the entire periphery of the electrode.

We accomplish these desirable results and overcome the aforementioned disadvantages of the prior art by providing a cutting apparatus comprising a cutting electrode, means for moving said electrode, means for supporting a workpiece adjacent a cutting surface of said electrode such that said cutting surface can be moved continuously in a direction substantially parallel to the face of the cut to be made in said workpiece, means for translating one of said workpiece and said electrode toward and away from the other, a source of electric potential and a pulse generating circuit connected to said electrode and said workpiece to induce repetitive discharges across a gap between said electrode and said workpiece, and means for interjecting a combustion supporting medium into said gap whereby combustion of said workpiece at said cutting face is initiated by said gap discharges.

We also desirably provide similar cutting apparatus wherein said combustion medium is injected through passage means in said electrode, said passage means opening into said gap.

We also desirably provide similar cutting apparatus wherein said electrode is a rotatably mounted disc disposed generally parallel to the direction of intended cut in said workpiece.

We also desirably provide similar cutting apparatus wherein a plurality of radial passages are provided in said electrode, and distributing valve means are coupled to said passages for injecting portions of said medium into said radial passages to the extent that a given one of said passages is juxtaposed to said workpiece.

We also desirably provide a similar cutting apparatus wherein a signal-sensing circuit is connected across said electrode and said workpiece in series with a source of balancing potential, and an electric drive motor forms part of said translating means and is coupled to an output of said signal circuit and said balancing potential to translate the associated one of said electrode and said workpiece in accordance with the metal removal rate effected by said cutting apparatus.

We also desirably provide a cutting method comprising the steps of initiating a repetitive sparkover initiated discharge between a conductive electrode and workpiece, and introducing a combustion supporting medium between said electrode and workpiece.

During the foregoing discussion, various objects, features and advantages of the invention have been set forth. These and other objects, features and advantages of the invention, together with structural details thereof, will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein.

Figure 1:
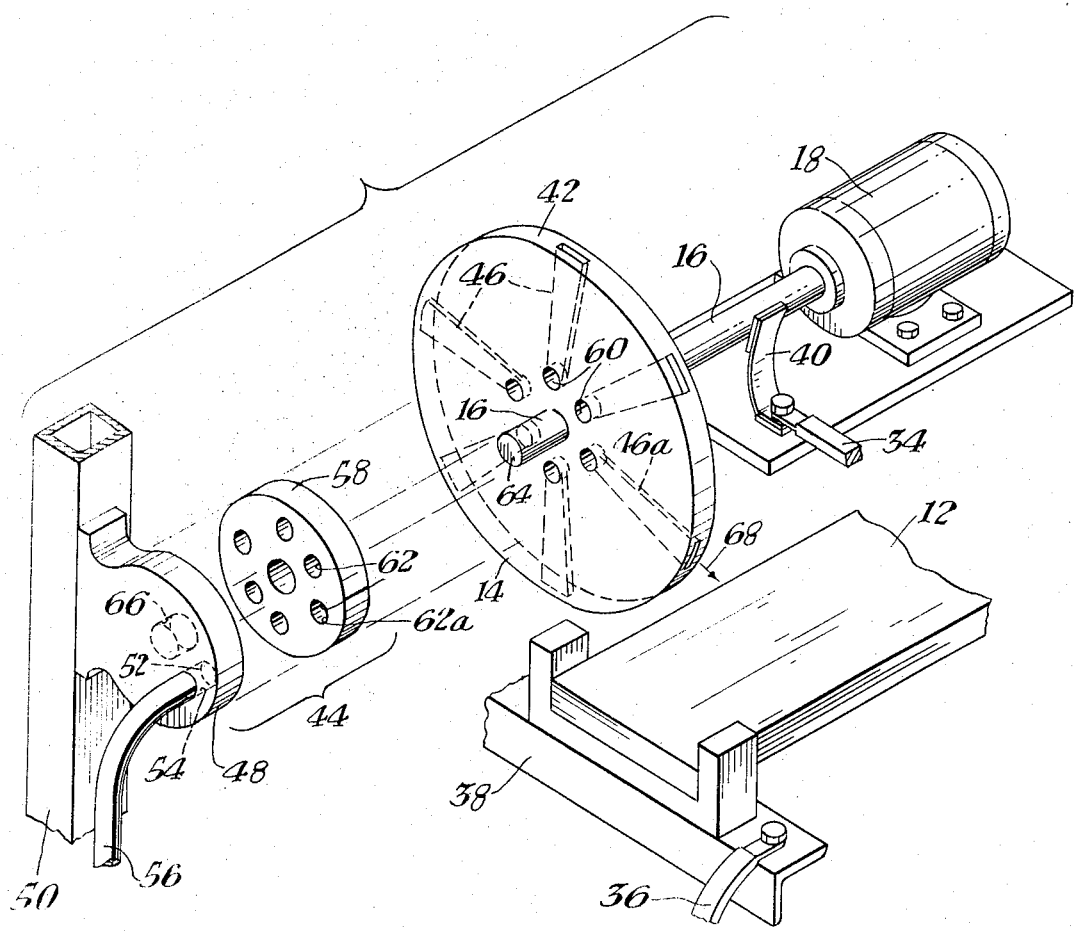
FIG. 1 is a partial enlarged and partially exploded isometric view of one form of cutting apparatus arranged in accordance with our invention.
Figure 2:
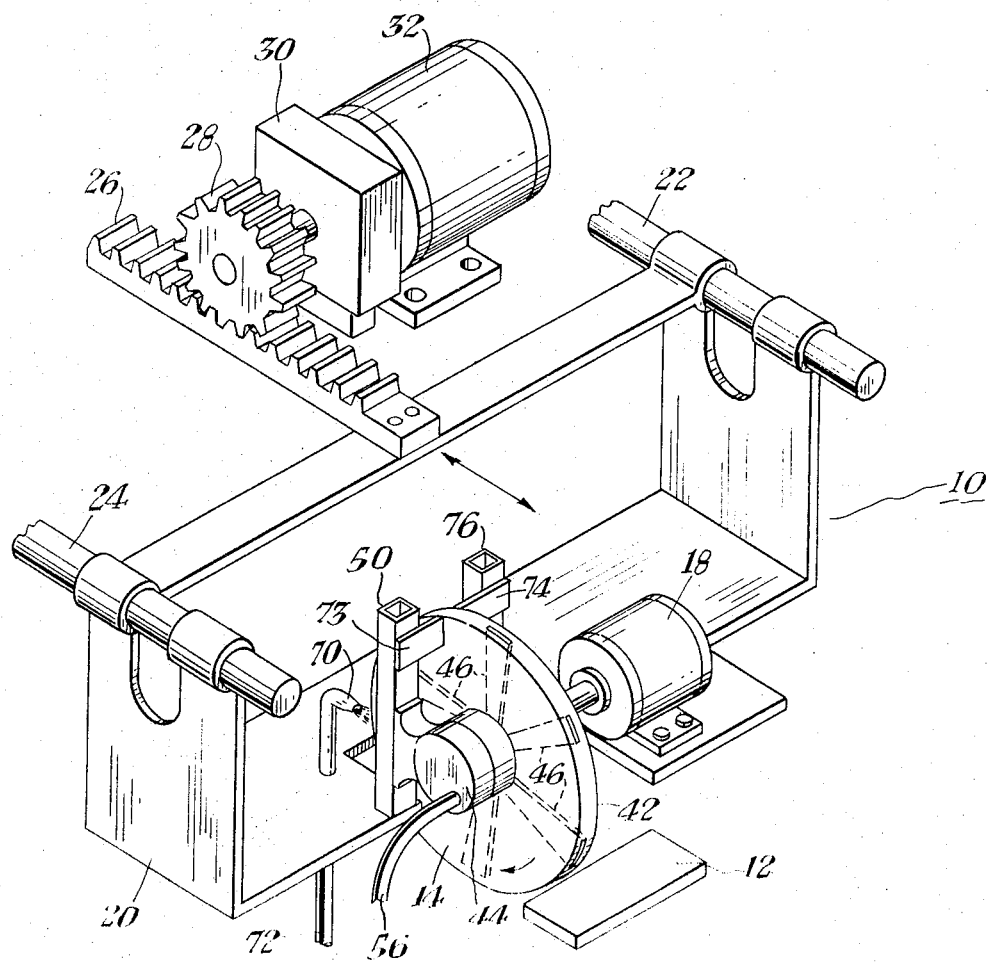
FIG. 2 is another isometric view of the apparatus as shown in FIG. 1 and illustrating means for moving the electrode relative to a workpiece.

Referring now more particularly to FIGS. 1 and 2 of the drawings the exemplary form of our cutting apparatus 10 shown therein comprises a workpiece 12, electrode 14 and means presently to be described for translating one of the workpiece and electrode relative to the other. In this example, the electrode 14 is mounted for compound movement, that is to say, it is mounted for continuous movement, in this example, rotation on drive shaft 16 (FIG. 1) upon operation of motor 18, and also for quiescent movement or translation toward and away from the workpiece 12. It will be apparent that the workpiece 12 instead can be mounted for movement by similar translation means, which will now be described.

As better shown in FIG. 2, the rotatable electrode 14 and drive motor 18 are mounted upon a movably mounted frame 20, which, in this example, is suspended from a pair of slide bars 22, 24. The slide bars 22, 24 are disposed such that sliding movement of the frame 20 therealong carries the electrode 14 toward and away from the workpiece 12. A suitable support (not shown) is provided for so mounting the slide rods 22, 24 and for mounting a rack 26 secured to the frame 20. Cooperating with the rack 26 are pinion 28, speed reducer 30 and drive motor 32. Circuit means presently to be described are connected to the drive motor 32 for energizing the motor in accordance with the rate at which metal is being removed by the rotating electrode 14. The cutting apparatus 10, therefore, is capable of automatic feeding under varying conditions as described more fully below.

Although the electrode 14 is illustrated as a circular electrode or blade, it will be understood that other shapes of movably mounted electrode can be utilized. For example, a moving band or wire can be looped over a pair of spaced pulleys (not shown) mounted on the frame 20 for movement therewith. The band or wire or other electrode shape is moved continuously in band-saw fashion.

When operating the cutting apparatus 10, the circular blade or electrode 14 is brought very close to or in contact with the workpiece 12. The blade 14, however, can be of considerably softer material than that of the workpiece 12, owing to the cutting phenomena of the invention. For example, the workpiece 12 can be a high carbon or alloy steel of considerable hardness while the blade 14 can be fabricated from aluminum or one of its alloys. Other materials can be employed depending upon the application of the invention, as long as such materials are capable of electrical conductivity.

The blade 14, in accordance with the invention, is not subject to a considerable amount of friction as in the case of frictional cutting and abrading apparatus. Although the blade 14 is fabricated from a relatively low melting material relative to the workpiece 12 and is subject to the heat of combustion of the workpiece, means are provided for adequately cooling the blade 14 to prevent its deterioration. Such cooling is facilitated, of course, by the continuous movement or rotation of the electrode 14.

Figure 3:
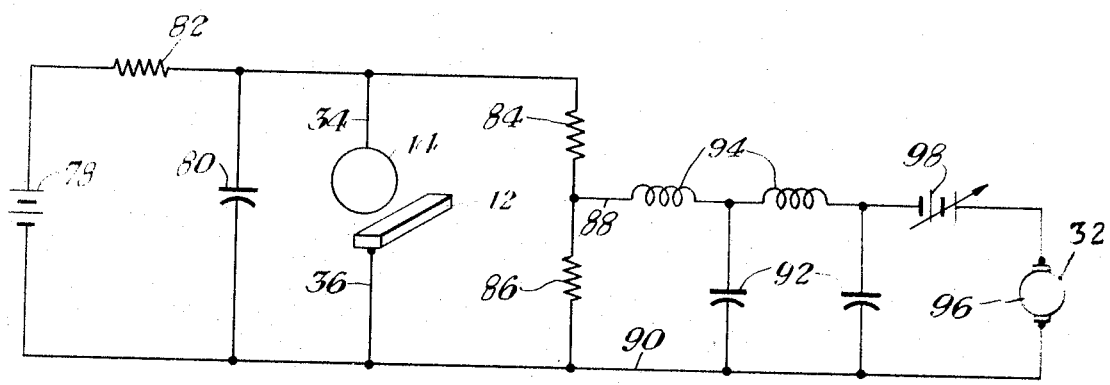
FIG. 3 is a schematic circuit diagram of one form of supply and control circuit for the apparatus shown in FIGS. 1 and 2.

When the blade 14 is brought near or into contact with the workpiece 12, a potential can be developed therebetween through electric leads 34, 36 to which is connected a suitable supply circuit such as the circuit of FIG. 3. As better shown in FIG. 1, the workpiece lead 36 is connected to a supporting framework 38 for the workpiece 12. The other lead 34 is secured to a brush contact 40 mounted on the movable frame 20 and contacting the drive shaft 16 on which the electrode 14 is secured in electrical contact therewith.

Operation of the power supply of FIG. 3 or a similar power supply capable of delivering electrical pulses through leads 34, 36 causes rapid but discrete electrical discharges between the peripheral electrode edge 42 and the workpiece 12. Even if the electrode 14 lightly contacts the workpiece 12, the contact of course is intermittent owing to vibration, manufacturing clearances and the like. In effect, then, a discharge gap exists between the electrode 14 and the workpiece 12 even though these items are sometimes in physical contact. The very close or actual contact between the workpiece and electrode have the advantage, provided by the continuous movement of electrode 14, of maintaining the discharge gap between the electrode 14 and workpiece 12 free of molten metal, slag, and other debris.

The apparatus described thus far would operate as a typical EDM process with ambient air serving as the dielectric fluid. The cutting rate probably would be somewhat faster than conventional EDM apparatus owing to the continuous movement of the electrode 14 and its sweeping of debris from the cut being made in the workpiece 12. The cutting speed, however, would be much too slow for the vast majority of cutting operations, for which our cutting apparatus is intended.

We provide a much faster cutting operation by combining the aforedescribed EDM process with combustional cutting, which uses, in this example, substantially pure oxygen as the combustion supporting medium. It is within the contemplation of our invention that oxygen or other combustion supporting medium can be injected into the aforementioned discharge gap between the electrode and workpiece from a suitable nozzle or jet structure (not shown) placed nearby and connected to a source of the combustion supporting medium. Although this arrangement would be effective for many cutting operations, it is difficult to properly interject the medium thus released into the discharge gap without wasting a considerable quantity of the medium. Accordingly, we have devised means for interjecting the combustion supporting medium directly at the interface of the cut as the electrode progresses through the workpiece.

One arrangement for so injecting the combustion supporting medium is best shown in FIGS. 1 and 2 of the drawings and includes a distribution valve 44, together with radial passages 46 formed in the electrode 14. The distribution valve 44 includes a stationary hub member 48 mounted on support 50 which is in turn secured to the movable frame 20. The fixed member or hub 48 is provided with an eccentric supply port 52 at which is secured fitting 54 and supply hose 56. The hose 56 is connected to a suitable cource (not shown) of a combustion supporting medium such as oxygen. The oxygen supplied through the hub aperture 52 is distributed through valve means 58 likewise forming part of the distributing valve 44 and into blade openings 60 which communicate respectively with the aforementioned radial blade passages 46. The valve means 58 is secured on drive shaft 16 for rotation therewith and is disposed flushly against the adjacent surface of the blade 14 such that its apertures 62 are aligned respectively with the blade openings 60. When the distributing valve 44 is thus assembled upon the drive shaft 16 (FIG. 2), the adjacent end 64 of the drive shaft 16 is rotatably inserted into central aperture 66 of the hub 48. The valve member 58 is machined on both side surfaces for flush engagement both with the hub 48 and the blade 14 when thus assembled.

The distributing port 52 of the hub 48 is oriented with respect to the discharge gap between the workpiece 12 and the electrode 14 such that oxygen issuing therefrom flows through a similarly aligned one of the valve means apertures, for example aperture 62a, for entry into the juxtaposed one of the blade radial passages 46a. Accordingly, as the blade 14 rotates, oxygen is emitted only from that one of the blade passages, such as the passage 46a, which opens directly into the cut being made in the workpiece 12, as denoted by flow arrow 68 (FIG. 1). With this arrangement, a much smaller quantity of oxygen or other combustion supporting medium is required. Optimum cutting speeds have been obtained by this positioning of the oxygen jets. It is also desirable that oxygen or other combustion supporting medium successively issue from the radial passages 46 with sufficient velocity to avoid clogging of the peripheral outlets of the radial passages with molten metal.

As is known, each of the spark discharges across the gap between the electrode 14 and the workpiece 12 results in a highly localized heating and melting of the workpiece. According to a present understanding of the invention, this heating is sufficient to ignite the workpiece material in the presence of the oxygen, but only at the face of the cut. The combination of the transient spark discharges and the burning induced by the oxygen maintain a molten interface in the workpiece area and directly opposite the peripheral edge 42 of the rotating blade. No burning occurs at the sides of the cut, as no spark discharges occur at the sides of the blade 14. The molten metal is removed from the face of the cut by the abrasive or sweeping action of the rotating blade 14, by the explosive forces of subsequent gap discharges, and by the force of the oxygen jet from the juxtaposed radial blade passage 46a (arrow 68).

We have found that the cutting rate is increased in the neighborhood of ten-fold when an oxygen assist is applied to the cutting apparatus 10, as compared to the use of the aforementioned EDM process alone. On the other hand, we have found that the combustion of the workpiece is not self-sustaining by continued application of oxygen in the absence of the spark discharge alone. It is apparent that the combustive cutting induced by the oxygen required the continuous "ignition" of the gap discharge. It is contemplated, in addition to these combinative cutting phenomena, that an electrode blade of hardened material can be substituted for mechanical attrition of the workpiece at the face of the cut.

Inasmuch as the combustive cutting action is dependent upon the repetitive gap discharges and as these discharges appear only between the peripheral edge 42 of the electrode 14 and the face of the cut in the workpiece 12 (in accordance with EDM considerations), the combustive cutting is also confined to the face of the cut. Accordingly, there is virtually no combustion of the workpiece material at the sides of the cut and the ragged edges of conventional arc cutting or oxygen cutting operations are avoided.

In the illustrated arrangement, physical work performed by the electrode blade involves only the removal of molten metal from the cut in the workpiece 12. Thus there is a relatively small drag force on the blade 14 during the cutting operation. The rotational velocity of the blade 14, moreover, need only be high enough to prevent the blade from melting while passing through the cutting area. Aside from these constraints, we have determined that the speed and size of the motor 18 or other suitable drive means are relatively unimportant parameters. The adaptability of our cutting apparatus 10 to the use of relatively slow blade rotational speeds means that relatively large diameter blades or electrodes can be used safely. This is in sharp contrast to the conventional frictional or abrasive cutting operation, in which the size of the blade is severely limited by edge speed considerations.

Owing to the considerable quantity of heat evolved by the cutting operation, the electrode 14 can accumulate considerable heat while passing through the cut. To prevent overheating of the blade 14, cooling means are provided therefore. One arrangement of such cooling means is shown in FIG. 2 of the drawings. In one arrangement of our apparatus 10, we have provided a water jet 70 to effect such cooling by connection through a suitable hose 72 to a tap or other source (not shown) of water under pressure. In place of the water jet 70, an atomizing orifice structure can be utilized. Preferably the water jet 70 is juxtaposed to a portion of the electrode blade 14 which is remote from the cutting area, as it is essential that the coolant does not contact the cutting area. The blade 14 also or alternatively can be cooled by the injection of combustion supporting fluid therethrough as described previously.

As the electrode blade 14 is usually employed to remove molten metal from the face of the cut in the workpiece 12, some of this molten metal and the slag associated with the combustional process may adhere to the blade periphery. It is desirably necessary to maintain a relatively clean blade during the cutting operation. The slag and molten workpiece material that cling to the blade may adhere and harden on its peripheral edge 42 and cause the blade to bounce or vibrate in the cut. This can create a severe problem as no gap discharges will occur when the blade bounces away from the cut. A momentary interruption in the gap discharges may cause a considerable reduction in cutting speed.

A number of means can be provided for reducing the slag build-up on the electrode blade 14. For example, a compressed air jet (not shown) can be directed at the blade 14 where the blade exits from the cut, or the blade can be sprayed with a water jet. Slag build-up can be reduced or eliminated by fabricating the blade 14 from non-galling material, such as cast iron or Waukesha metal No. 28, a nickel alloy manufactured by Waukesha Foundry Company in Waukesha, Wisconsin. Alternatively, as shown in FIG. 2, the slag build-up can be obviated completely by continuously scraping the sides of the blade 14 with a pair of scrapers 73, 74, which are disposed to lightly engage respectively those adjacent side surfaces of the electrode blade 14 which are adjacent its peripheral edge 42. The scrapers 73, 74 are mounted respectively on the hub standard 50 and upon a similar standard 76 mounted adjacent the other side of the blade 14.

In FIG. 3 of the drawings, a power supply and control circuit are illustrated for use with the automatic cutting apparatus 10 of FIG. 2. For applying the aforementioned EDM pulses to the electrode 14 and workpiece 12, a source of unidirectional potential 78, capacitance 80 and charging resistance 82 are connected in the form of a relaxation type power supply to the electrode and workpiece conductors 34, 36. The items 78, 80, 82 are sized, in accordance with known EDM techniques, such that gap discharges of relatively high current values are induced between the blade 14 and workpiece 12 but that sustained arcing does not occur between the blade and workpiece. In one of our experimental installations, the resistance 82 was made about one-half ohm while the capacitance of the capacitor 80 was about 3,000 mfd. Obviously these values will vary depending upon a specific application of the invention.

Resistance 84, 86 constitute a voltage dividing network which is also connected to the electrode and workpiece leads 34, 36 and hence across the discharge gap. An output of the voltage dividing network, on conductors 88, 90, is filtered by a low pass filter network including capacitances 92 and inductances 94. The resultant control signal thus derived from the voltage dividing network and the low pass filter is connected serially across armature 96 of the movable frame drive motor 32 (FIG. 2) and a balancing source of supply voltage 98. The function of the low pass filter 92, 94 is to remove high frequency components of the oscillatory gap discharges from the control signal thus derived. The resultant control signal varies directly with the material removal rate effected by the cutting apparatus 10 such that the frame drive motor 32 is rotated more rapidly or more slowly, in accordance with the material removal rate at a given instant.

Figure 4:
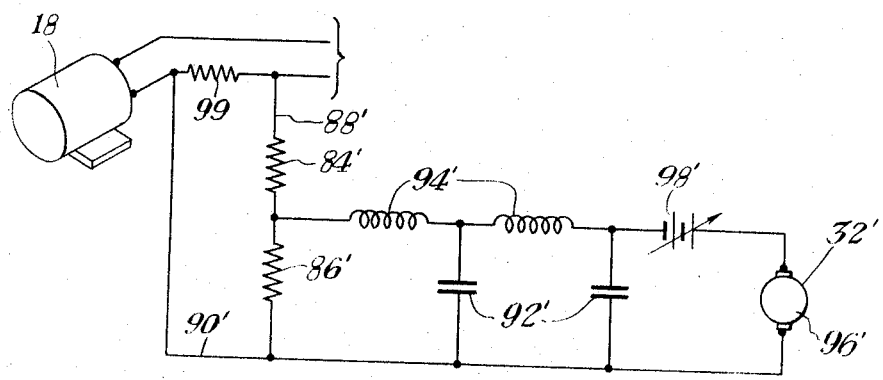
FIG. 4 is a similar diagram of another form of control circuit.

Another form of our control circuit is shown in FIG. 4. We have found that the power consumption of the electrode drive motor 18 or 18' (FIGS. 1, 2 and 5) varies with the rate of material removal. Therefore, a signal component equivalent to the current drawn by the drive motor 18 (or 18') is developed across resistance 99 in the motor supply circuit, and applied to the voltage dividing network 84', 86'. The resultant control signal is then applied to the translating motor 32' (FIG. 2), as described above relative to FIG. 3.

Figure 5:
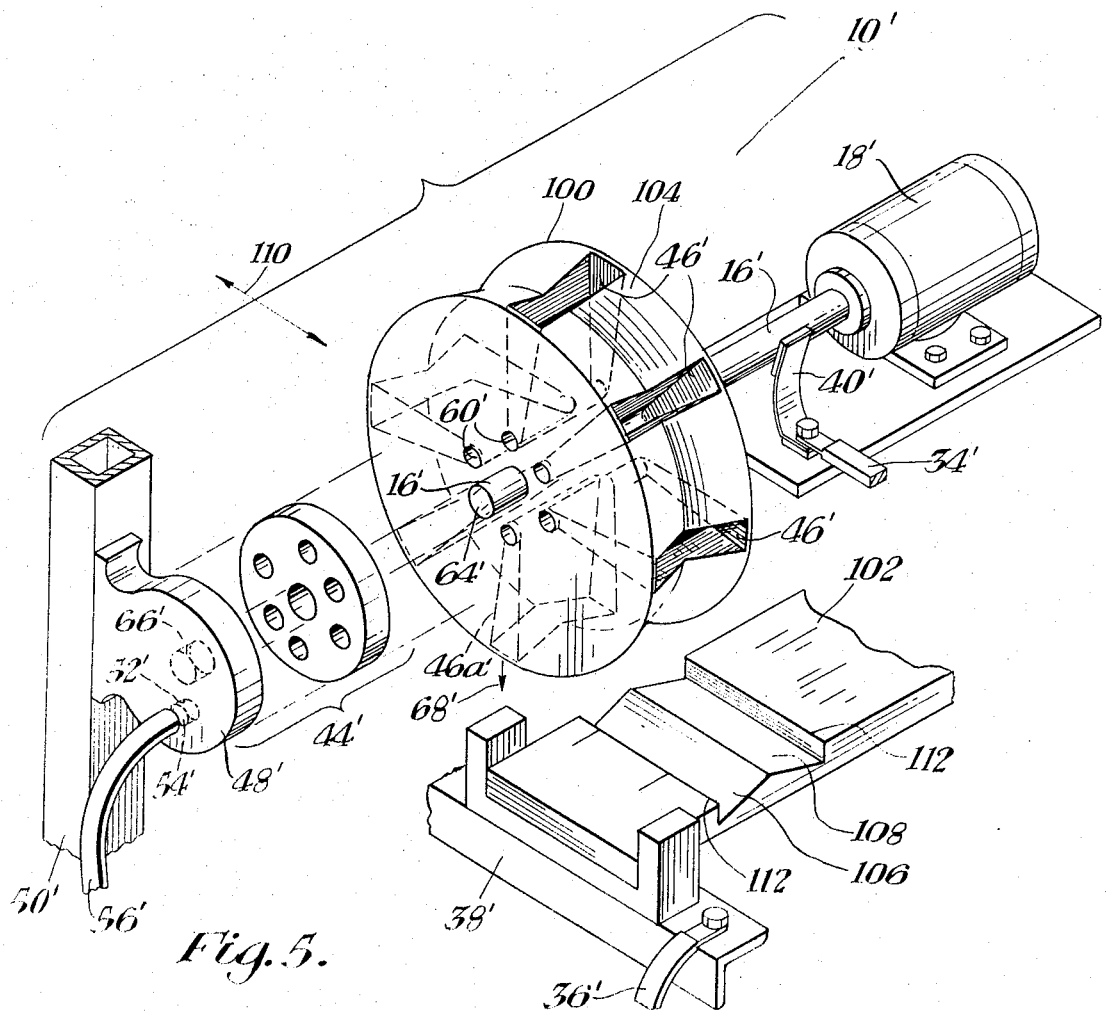
FIG. 5 is a view similar to FIG. 1 and illustrates another form of cutting apparatus of our invention.

Another modification of our invention is illustrated in FIG. 5 wherein similar reference characters with primed accents denote similar components of FIG. 1. The cutting apparatus 10', however, is particularly arranged for other forms of cutting operations rather than severing or sawing operations for which the apparatus of FIGS. 1 and 2 is primarily adapted. In the arrangement of FIG. 5, a cutter 100 is provided with a correspondingly greater thickness and is otherwise shaped for typical grinding and/or milling operations upon workpiece 102. The cutter 100 can be provided with a particular peripheral contour 104, which is complementary to the intended width and shape of cut 106 in the workpiece 102. It will be understood, of course, that cutter peripheries of differing edge configuration than that denoted at 104 can be substituted depending upon the nature and shape of the cut 106 desired.

As explained previously, the transient electrical discharges occur only between the periphery 104 of the cutter 100 and face 108 of the cut 106. It follows then, as noted previously, that the width of the cut 106 is not substantially greater than the thicknesses of cutter 100. Moreover, the face 108 of the cut 106 is inversely contained as shown.

Oxygen or other combustion supporting gas is emitted from the cutter 100 adjacent the face of the cut 106 in much the same manner as described previously with reference to FIG. 1. In the arrangement of FIG. 5, however, the inlet aperture or distribution port 52' in hub 48' is located directly beneath the central shaft aperture 56' so that the medium is emitted successively from the apertures 46' as they are disposed in the downward position denoted by aperture 46a'. Thus, the combustion medium is emitted directly onto the face 106 (arrow 68') as the cutter 100 is moved over the workpiece 102 (arrow 110). The radial passages 46' preferably are made as wide as possible, as shown in FIG. 4, so that the combustion medium is distributed uniformly as possible between the lateral edges 112 of the cut 106. Our cutting apparatus 10' of FIG. 5 otherwise operates in the same manner as that described in the preceding figures.

From the foregoing, it will be apparent that novel and efficient forms of Electrically-Assisted Combustion Cutting Apparatus have been described herein.

While we have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

We claim:

1. Cutting apparatus comprising a cutting electrode of a rotatably mounted disc disposed generally parallel to the direction of intended cut in a workpiece, means for moving said electrode, means for supporting the workpiece adjacent a cutting surface of said electrode such that said cutting surface can be moved continuously in a direction substantially parallel to the face of the cut to be made in said workpiece, means for translating one of said workpieces and said electrode toward and away from the other, a source of electric potential and a pulse generating circuit connected to said electrode and said workpiece to induce repetitive spark machining type discharges across a gap between said electrode and said workpiece, and means for interjecting a combustion-supporting medium into said gap for combustion of said workpiece at said cutting face, said means for interjecting including a plurality of radial passages extending through said electrode and opening into the cutting edge thereof, distributing valve means coupled to the passages for injecting portions of said medium into said radial passages to the extent that a given one of said passages is juxtaposed to said workpiece.

2. The combination according to claim 1 wherein said electrode disc is mounted on a drive shaft for rotation therewith, said distributing valve includes apertured valve means juxtaposed to said electrode disc, and a stationary hub member is juxtaposed to said valve member and shaped to rotatably receive and support an end of said drive shaft, said hub having an inlet port coupled to a source of said combustion medium, and valve means having a number of apertures positioned for successive engagement with said port as said shaft is rotated.

3. The combination according to claim 1 wherein said electrode disc, said drive shaft and rotating means for said shaft are mounted upon movable support, and said translating means are coupled to said support for translating said electrode disc toward and away from said workpiece.

* * * * *